United States Patent [19]

Marten et al.

[11] Patent Number: 4,554,658
[45] Date of Patent: Nov. 19, 1985

[54] SYSTEM FOR PRODUCING ENCODED AND DECODED VOICE, INTERNAL AUDIO TONES, AND DATA COMMUNICATION WITHIN A TIME DIVISION MULTIPLEX NETWORK

[75] Inventors: Russell A. Marten, Schaumburg; Greg M. Townsend, Palatine, both of Ill.

[73] Assignee: Motorola, Inc., Schaumburg, Ill.

[21] Appl. No.: 511,682

[22] Filed: Jul. 7, 1983

[51] Int. Cl.[4] ............................ H04J 3/02; H04J 3/12
[52] U.S. Cl. ..................................... 370/85; 370/110.2
[58] Field of Search ............. 370/85, 110.2, 86, 110.3; 179/18 EB

[56] References Cited

U.S. PATENT DOCUMENTS

| | | | |
|---|---|---|---|
| 3,816,666 | 6/1974 | Tomozawa et al. | 179/15 BS |
| 3,889,063 | 6/1975 | Slavin | 370/85 |
| 3,924,077 | 12/1975 | Blakeslee | 370/85 |
| 3,940,561 | 2/1976 | Heinze et al. | 370/85 |
| 4,161,786 | 7/1979 | Hopkins et al. | 364/900 |
| 4,203,008 | 5/1980 | Cohn-Sfetcu et al. | 370/50 |
| 4,254,896 | 3/1981 | Munter | 370/85 |
| 4,271,505 | 6/1981 | Menot et al. | 370/85 |
| 4,310,721 | 1/1982 | Manley et al. | 375/8 |
| 4,319,083 | 3/1982 | Wiggins et al. | 179/15 A |
| 4,339,633 | 7/1982 | Ahmed | 370/85 |
| 4,344,148 | 8/1982 | Brantingham et al. | 364/724 |
| 4,351,049 | 9/1982 | Nobis | 370/85 |
| 4,398,287 | 8/1983 | Spencer | 370/85 |
| 4,402,073 | 8/1983 | Hammond | 370/85 |

Primary Examiner—Douglas W. Olms
Assistant Examiner—Frank M. Scutch, III
Attorney, Agent, or Firm—James E. Jacobson; Edward M. Roney; Donald B. Southard

[57] ABSTRACT

A system and method for use in a network of the type including a bus which carries a plurality of digital, multiple bit time divided channels of information including audio information provides for the decoding of digital audio within one of the channels to analog audio signals, the coding of analog audio to digital audio and the placing of the digital audio onto the bus within one of the channels, and the generation of internal or localized analog tones in an improved and efficient manner. A decoding means is provided for converting a digital multiple bit word to analog form. A control means which includes tone generating means adapted for providing digital multiple bit tone words controls a select means which selectively couples the decoding means to the bus to enable decoding of the digital audio or to the tone generating means for providing the analog tones in response to digital data received from the bus within a preselected channel. The decoding means if further capable of converting analog audio to digital audio to be placed upon the bus. The control means further is adapted to convey digital data to the bus within the preselected channel.

29 Claims, 3 Drawing Figures

4,554,658

SYSTEM FOR PRODUCING ENCODED AND DECODED VOICE, INTERNAL AUDIO TONES, AND DATA COMMUNICATION WITHIN A TIME DIVISION MULTIPLEX NETWORK

BACKGROUND OF THE INVENTION

The present invention relates to a new and improved system and method for converting digital multiple bit audio signals to analog audio signals and for generating internal or localized audio tone signals in a manner which is more economical in terms of necessary circuitry and hardware than heretofore possible. More particularly, the system of the present invention can be utilized to great advantage in a communication network of the type which has a bus for carrying a plurality of digital, multiple bit time divided channels of information including audio to be conveyed therefrom in analog form and data which controls the operation of the system and the overall operation of the network. The system and method of the present invention also provide for the generation of digitized data and placing the data onto the bus.

Communication networks wherein any one of a plurality of operator positions is to be coupled to any one of a plurality of remotely located base station transmitters often utilize time division multiplexing to provide the number of audio channels necessary for achieving total network capacity. In networks of this type, a bus is generally utilized for carrying a plurality of digital multiple bit time divided channels of audio which run in both directions between the operator positions and the base stations. An interface system is generally required between the bus and each of the base stations. The interface system must be capable of decoding the digitized audio received from the operator positions and converting the same to analog audio signals for transmission. The interface system must also be capable of generating tones for keying purposes or the like, and, depending on the overall system and network organization and operation, generating data.

In the prior art, each of the foregoing functions has been accomplished separately and independently. Hence, each interface system would have a separate decoder for only decoding digitized audio, a separate tone generator for generating audio tones, and a separate data generating means for placing required data onto the bus to maintain the proper network organization.

The separate implementation of these functions adversely impacts upon the overall network cost, especially when a number of interface systems are required. Both the cost of labor and materials is increased as a result of the separate and dedicated circuitry required to accomplish each of these separate functions.

Not only is network cost adversely affected, but the cost of maintaining the network is also adversely affected. When more component parts are required in a system, either the physical size of the system must be increased to accommodate all of the components, or the component density must be increased. If the physical size of the network is increased, the overhead associated with the space which the systems occupy also must increase. In the latter case, if component density is increased, the systems are rendered more complicated thus increasing service maintenance costs when service is required.

It is therefore a general object of the present invention to provide a new and improved system and method for converting digitized audio carried on a bus in one of a plurality of time slots to analog audio and for generating localized tone signals.

It is another object of the present invention to provide such a system and method which requires fewer component parts than heretofore required for accomplishing these functions.

It is a further object of the present invention to provide such a system and method which includes generating data and placing the data onto the bus in a manner which does not unduly increase the complexity of the system.

It is a still further object of the present invention to provide such a system wherein the analog tones and decoded analog audio are provided from a common decoder.

SUMMARY OF THE INVENTION

The invention therefore provides a system for use in a network of the type including a bus arranged for carrying a plurality of time divided multiple bit channels of information wherein each channel is assigned an identifiable time slot and wherein at least one of the channels is adapted for containing a digital multiple bit word representing audio communication. The system provides the decoding of the digital multiple bit audio word of the at least one channel to an analog audio signal and generates internal analog tone signals. The system comprises decoding means for converting a digital multiple bit word to an analog signal, control means including tone generating means adapted for providing at least one digital multiple bit tone word, and select means responsive to the control means for selectively coupling the decoding means to the bus or to the tone generating means. When the select means couples the decoding means to the bus, the system provides the analog audio signal, and when the select means couples the decoding means to the tone generating means, the system provides the internal analog tone signal.

In accordance with a preferred embodiment of the present invention, the control means is coupled to the bus for receiving data from the bus contained within a data channel, and includes data generating means for providing digital data signals to said data channel on said bus.

The invention further provides a method of converting a digital multiple bit audio word corresponding to audio information carried on a bus to an analog audio signal and generating internal localized tone analog signals. The method comprises the steps of providing a decoder capable of converting a digital multiple bit word to an analog signal, locally generating at least one digital multiple bit tone word, and thereafter, selectively conveying the digital multiple bit audio word on the bus or the locally generated digital multiple bit tone word to the decoder.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENT

Figure 1:
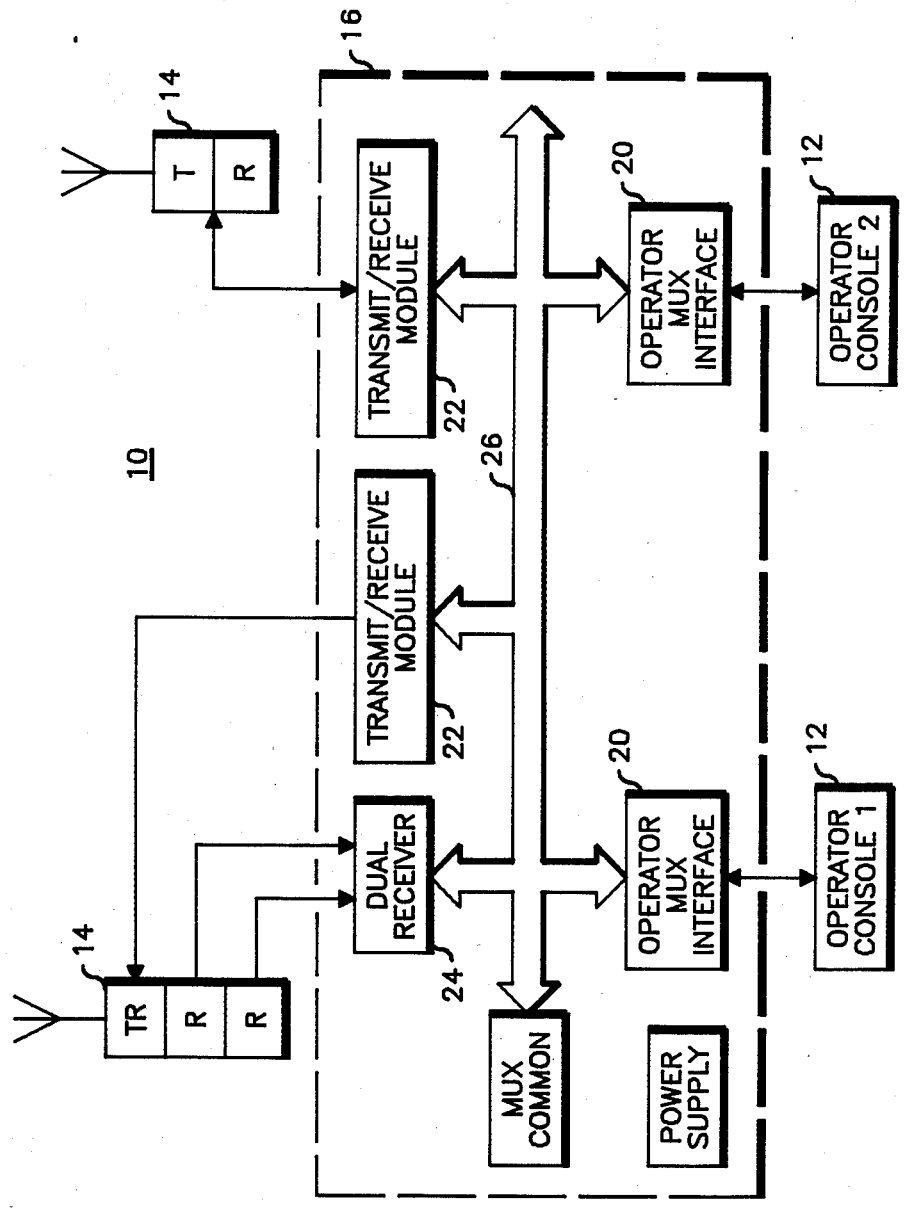
FIG. 1 is a block diagram of a communication network embodying the present invention.

Referring now to FIG. 1, it illustrates in block diagram form, a communications network embodying the present invention. The communications network generally designated by reference numeral 10 includes a plurality of operator consoles or positions 12, a plurality of base stations 14, and a common electronics bank 16. The common electronics bank 16 establishes communication between any one of the operator positions 12 with any one of the base stations 14. More specifically, the common electronics bank permits the voice audio generated at any one of the operator consoles 12 to be conveyed to any one of the base stations 14 for transmission therefrom and permits the received voice audio at the base station to be conveyed back to the operator console. The voice audio generated by the operator consoles and by the base stations are in analog form. The common electronics bank 16 converts the voice audio analog signals from the operator consoles to digitized audio, places the digitized audio onto a bus within the common electronics bank 16 within an identifiable time slot, decodes the digitized voice audio within that time slot to analog signals, and then conveys the same to one of the base stations for transmission. Conversely, the received voice audio from that base station is converted to digitized audio by the common electronics bank, is placed onto the bus in another identifiable time slot, is decoded by the common electronics bank to an analog signal, and then conveyed to the operator console so that the received voice audio may be heard by the operator at that console.

The common electronics bank permits the communication between any one of the operator consoles 12 and any one of the base stations 14. The common electronics bank generally includes a mux common 18, a plurality of operator mux interfaces 20, a plurality of transmit/receive modules 22 of the type embodying the present invention, and a dual receiver 24. Although only one such dual receiver 24 is illustrated in the figures, in actual practice, more than one dual receiver can be provided.

Each of the operator consoles 12 is hard wired to a respective given one of the operator mux interfaces 20. Similarly, each of the transmit/receive modules is coupled to a respective given one of the base stations 14. Within the common electronics bank and interconnecting the mux common 18, operator mux interfaces 20, transmit/receive modules 22, and the dual receiver 24 is a bus 26. The bus 26 is of the type which carries a plurality of time divided multiple bit channels of information wherein each channel is assigned an identifiable time slot. A particular one of the time slots or channels is dedicated for carrying digitized data to initiate and control operation of the common electronics bank. The remaining time slots are adapted for containing digital multiple bit words representing audio communication between the operator consoles and the base stations. As will be appreciated hereinafter, the bus 26 may include one or more buses with each bus containing 32 channels, each channel consisting of eight-bit slots. For example, each of the buses can be time division multiplexed buses consisting of 32 time slots or channels with one bus having a dedicated channel for data communication and 31 channels adapted for carrying digitized audio. The remaining buses are adapted for containing digitized audio in all 32 time slots or channels. As a result, 95 audio time slots are provided so that any number of operator consoles and base stations can be utilized within the network as long as their total number does not exceed 95.

The mux common 18 provides clock and synchronization signals for the common electronics bank. This module is a central control point for the system. The mux common also provides arbitration for the use of the data channel by the operator mux interfaces 20, transmit/receive modules 22, and the dual receiver 24.

The operator mux interfaces 20 interface the operator positions to the time division multiplexed bus 26. Each operator mux interface contains its own communications hardware for sending and receiving data on the time division multiplex bus data channel or slot, as well as analog-to-digital converters to convert the operator's audio to an eight-bit pulse code modulated (PCM) serial data stream and the hardware to insert the digitized audio into a fixed channel or slot on the time division multiplexed bus 26. In addition, the operator mux interfaces contain a programmable multi-slot receiver circuit which can listen to any or all slots or channels on the bus, converting the digital audio on the bus within a desired channel to an analog audio signal which eventually ends up in one of the operator console speakers.

The transmit/receive modules 22, of the type embodying the present invention, and which will be described in greater detail hereinafter, generally include a single slot digital-to-analog converter whose output is connected to a telephone line driver circuit so that the digitized audio within any one of the time slots or channels assigned to the operator mux interfaces can be sent to the base station transmitter. Each transmit/receive module also contains a single analog-to-digital converter for placing its base station received audio into a fixed or dedicated slot or channel onto the bus 26. In addition, each transmit/receive module contains a microprocessor and dedicated hardware for data communication with the operator mux interfaces by way of the data channel on the bus 26. Also, and as will be more particularly described hereinafter, the transmit/receive modules also include tone generating means for producing internal or localized tones required for base station keying, paging, or the like.

The dual receiver 24 is similar to the transmit/receive modules 22. It, however, includes two analog-to-digital converters for inserting the received audio of two base stations onto the bus 26.

As previously mentioned, the bus 26 can actually consist of three buses running in parallel. Each bus can include 32 channels or time slots with each channel containing eight bits. The clock speed for each bus in this case is approximately 2 megahertz giving a 64K bit per second data rate for the digital audio and data communications Also as previously mentioned, the data communications between the modules in the common electronics bank takes place on one dedicated time slot on just one of the buses.

When any one of the modules of the common electronics bank is to send a data message within the data channel, it sets a flip-flop indicating to the mux common 18 that data is to be sent in the data time slot. This signal is called data request. The mux common 18 continuously polls all data points in the system for data requests, and upon finding one, it grants use of the data channel to the requesting module for a fixed number of consecutive frames if the data channel is currently not being utilized. After the consecutive number of frames, the mux common 18 then discontinues access to the data channel and again polls all other data points for a data request. If the requesting data point had not finished sending its data, the mux common would then provide access to the data channel for another period of consecutive frames. A module discovers it has been granted access to the data channel by first setting a data request and writing out a start of text character to its data output. When the mux common grants the data channel, this byte is shifted out into the data channel. The module then detects this start of text shifted into its receive data input and then sends its source address to the data output. When the module sees its own address shifted into its data input, it knows that the mux common has granted it use of the data channel and it continues to write the remaining bytes of this data packet to the data output. All reads and writes to the data channel are interrupt driven by a signal which is sourced by the mux common in synchronization with the data channel. As a result, data can be transferred to and from the modules at times when it is assured no data shifting is taking place.

The operator positions 12 preferably consist of momentary switches and indicating lights which are controlled by a microprocessor. When a switch is depressed, this microprocessor sends data in a four-byte data packet through a low speed asynchronous serial link to its associated operator mux interface 20. The receipt of the switch packet by the operator mux interface is acknowledged by sending an acknowledge byte back to the operator position. It then cross references the switch position to its function and transmits an appropriate data packet onto the bus to the module who is to execute the function associated with the switch. For example, if the request was a transmit function to one of the base stations, the operator mux interface would send a data packet to the appropriate transmit/receive module The transmit/receive module would then respond with an acknowledge data packet to all of the operator mux interfaces through the data channel. Every operator mux interface senses the contents of the acknowledgement data packet and determines if it was the operator mux interface which keyed the transmit/receive module. If not, the operator mux interface determines the position of the busy base station and sends a message on a low speed serial link to activate that indicating light. If so, the operator mux interface will light the transmit indicating light in a similar manner. In this way, all operator positions have parallel status. In other words, data communications between an operator position and a transmit/receive module take place where the data packet from the operator positions operator mux interface is addressed to a single transmit/receive module but the acknowledgement from the transmit/receive module is addressed to all operator mux interfaces to provide full parallel status.

As can be seen from the foregoing, all of the signals conveyed within the common electronics bank between the various modules are carried over the bus 26 in digitized form within the time slots or channels. The audio signals external to the common electronics bank, the audio signals between the common electronics bank and the base stations 14 and operator consoles 12 are in analog form.

Figure 2:
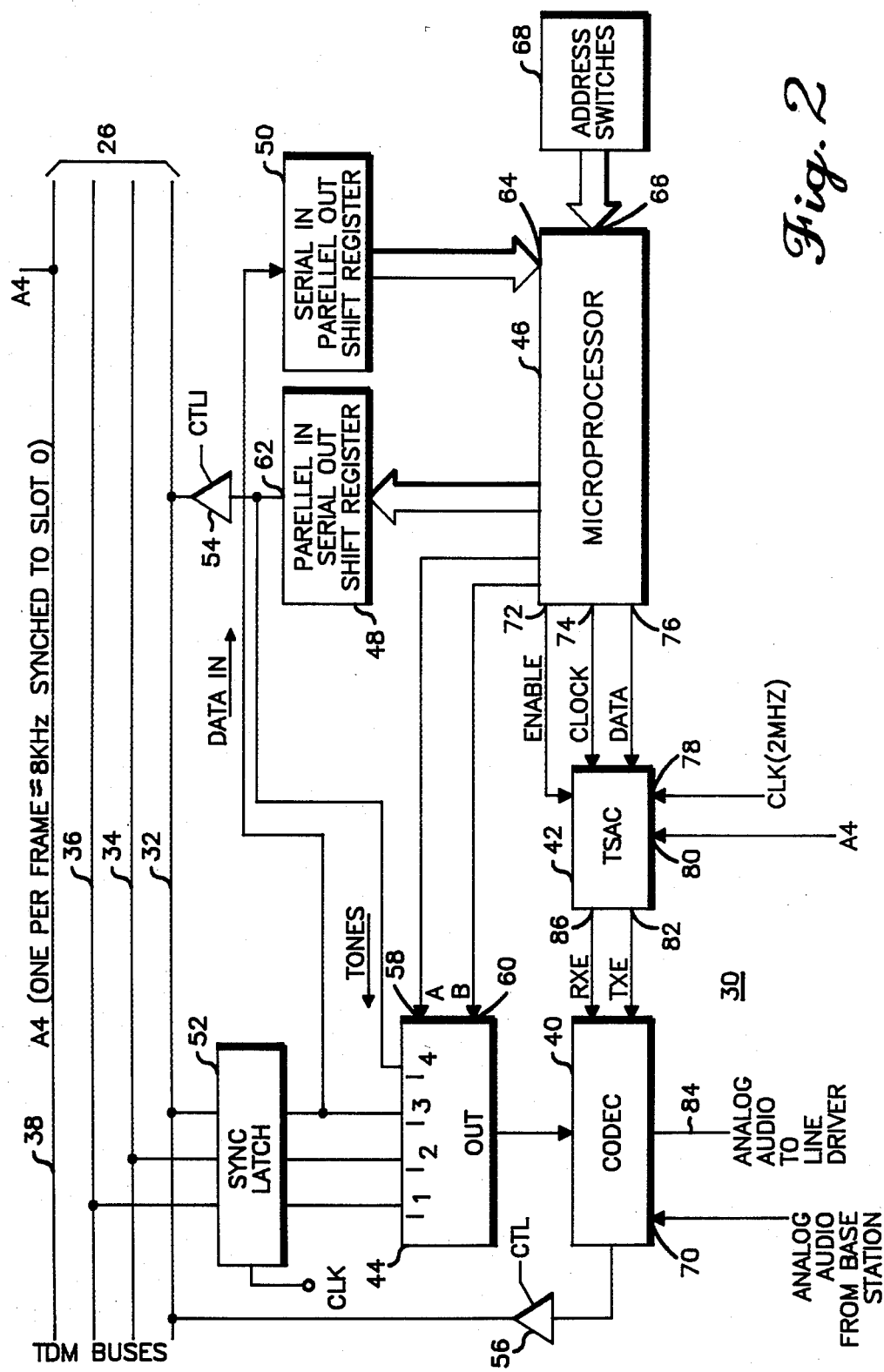
FIG. 2 is a diagrammatic representation of a system embodying the present invention.

Referring now to FIG. 2, it illustrates in diagrammatic form a transmit/receive module or system 30 embodying the present invention. As can be seen in FIG. 2, the system 30 is coupled to the bus 26 which includes a first bus 32, a second bus 34, and a third bus 36. Each of these buses are of the type previously referred to with respect to the description of FIG. 1 in that each bus contains 32 channels or time slots, and wherein, bus 32 contains the dedicated channel for data communication. The bus 26 includes a line 38 which carries an 8 kilohertz synchronizing signal which is synchronized to the data slot carried on bus 32. In this way, all channels are synchronized during each frame.

The system 30 generally includes a decoding means 40 in the form of a codec, a time slot assigning means 42, a select means 44, and a control means 46. The system 30 further includes a parallel-in-serial-out shift register 48, a serial-in-parallel-out shift register 50, a latch 52, and buffers 54 and 56.

The decoding means 40 is of the type which converts a digital multiple bit word to an analog signal. The decoding means 40 further can convert an analog signal to a digital multiple bit word. It can, for example, be a commercially available decoder manufactured by Motorola, Inc. under Part No. MC14403.

The decoding means or codec 40 is coupled to the select means 44 which can be a Motorola, Inc. MC14539. It includes four inputs. Three of the inputs are coupled to respective ones of the buses 32, 34, and 36 through the latch 52, and one input is coupled to the shift register 48. The shift register 48 is, in turn, coupled to the control means 46.

The select means 44 includes a pair of select inputs 58 and 60 coupled to the control means 46. As will be described hereinafter, the control means 46 responsive to the data which it receives from the data channel on bus 32 selectively couples the decoding means 40 to one of the buses or to the shift register 48.

The control means 46, which can be a Motorola, Inc. MC6803 includes a tone generating means adapted for providing at least one digital multiple bit tone word. The digitized eight-bit tone word is coupled to the select means through the shift register 48. The control means 46 also includes a data generating means having a common output on the control means with the tone generating means. The data to be placed onto the bus 32 within the dedicated data channel is conveyed to bus 32 through the buffer 54 which is coupled to a common output of the shift register 48. The common output 62 of the shift register 48 is coupled to both the data selector 44 and to the bus 32 through the buffer 54.

For receiving data, the control means 46 has a data input 64 coupled to the shift register 50. The shift register 50, in turn, is coupled to the latch 52 and to the bus 32 through the latch. The control means 46 also has another input 66 which is coupled to a series of switches 68. The switches 68 are settable to define the predetermined time slot in which the digitized audio from the system 30 is to be placed onto one of the buses, in this case, bus 32. The digitized audio is placed onto the bus through the buffer 56 which is coupled between bus 32 and the output of the decoding means 40. The decoding means 40 has an input 70 which is coupled to the base station receiver for receiving analog signals therefrom.

The control means 46 further includes an enable output 72, a clock output 74, and a data output 76. These outputs are coupled to the time slot assigning means 42, which can be a Motorola, Inc. 14416. The time slot assigning means further has an input 78 coupled to a 2 megahertz clock, and an input 80 which is coupled to the line 38 for receiving synchronization pulses.

The time slot assigning means 42 further includes an output 86 for enabling the decoding means for converting digitized audio to analog audio to be conveyed to the base station transmitter overline 84, and an output 82 which enables the decoding means for converting analog audio signals to digitized audio signals for placing the digitized audio onto the bus 32 within the preassigned time slot.

In operation, the control means 46 at its data input 64 senses when the system 30 is being requested to perform a given function, such as, decoding digitized audio to analog audio, generating internalized tones, generating data, or decoding analog audio to digitized audio. When the system 30 is requested to decode digitized audio to analog audio, the control means 46 will impress upon the data select inputs 58 and 60 the appropriate conditions to cause the decoding means 40 to be connected to the appropriate bus which is to carry the digitized audio information. Also, the control means 46, responsive to the data packet will set the time slot assigning means 42 to enable the decoding means when the appropriate time slot is reached. The decoding means 40, because it is coupled to the appropriate bus, is able to sense all of the digitized audio carried over that bus. However, when the appropriate time slot is reached, the time slot assigning means 42 enables the decoding means through its output 86 so that the digitized audio received by the decoding means is then decoded to analog form and available on line 84 for transmission.

If, on the other hand, the data packet received by the control means 46 indicated that the system 30 was to produce an internal audio tone for keying purposes or the like, the control means 46 will impress upon inputs 58 and 60 of select means 44 the appropriate input conditions to couple the decoding means 40 to the output 62 of shift register 48. The tone generating means within the control means 46 will then provide a parallel eight-bit binary word indicative of the tone to be generated. The shift register 48 shifts the parallel eight-bit word to its output 62 in serial manner. The now serialized eight-bit binary word is then conveyed to the select means 44 and to the decoding means 40. The decoding means 40 then decodes the eight-bit binary word representing an audio tone to an analog tone signal which is then available at line 84. The tone generating means continues, during each frame, to produce an eight-bit word representative of the tone to be produced. The composite of all of these eight-bit binary tone words decoded in the decoding means thereby results in the proper audio tone.

Hence, as can be seen from the foregoing, the system 30 utilizes the decoding means 40 for both decoding digitized audio to analog audio, and for providing analog tone signals. The control means 46 causes the select means 44 to selectively couple the decoding means 40 to either one of the buses or to the tone generating means of the control means 46. In this manner, duplication of hardware for performing these functions separately is avoided.

If the data packet received by the control means 46 requests the system 30 to place digitized audio onto the bus, the control means 46 will set the time slot assigning means 42 to enable the decoding means 40 when the preassigned time slot of the system 30 is reached on bus 32. Again, that preassigned time slot is assigned by the appropriate conditions of the eight switches 68.

When the preassigned time slot occurs, the time slot assigning means enables, through its output 82, the decoding means or codec, which include an encoder. As a result, the analog audio received from the base station at input 70 is encoded by the decoding means 40 and the eight-bit binary word representing that received audio is serially shifted onto the bus 32 through the buffer 56.

When the system 30 is to generate data, the control means 46 responsive to the data packet received at its input 64 will process the data and generate return data, such as acknowledge data. At this time, the select means 44 is disabled and the data passes from the control means 46 to the shift register 48 in a parallel binary bit word form. When the data time slot arrives, the data is passed onto the bus 32 within the dedicated data time slot by the activation of the buffer 54. The data is then serially shifted onto the bus 32.

As can be appreciated from the foregoing, the control means includes a channel time slot identification means which identifies from the received data packet the time slot in which the audio to be decoded from digital form to analog form is located on the bus system. The time slot assigning means 42 is thus coupled to the decoding means 40 and is responsive to the time slot identification means of the control means 46 for enabling the decoding means during the time slot of the channel from which the digitized audio is to be received. All of the foregoing is responsive to the data which is received over the data channel by the control means 46. The time slot identification means is responsive to the data within the data channel for identifying the time slot.

Also, the decoding means 40 includes encoding means for converting received analog signals from the base station to which the system 30 is coupled to digital multiple bit audio words. For this purpose, the decoding means 40, as previously explained, is coupled to the bus 32 through a buffer 56. The received audio, converted to digitized form, is provided to the bus 32 within a preassigned time slot as controlled by the control means and the switches 68.

From the foregoing, it can be seen that the present invention provides a system which decodes digitized audio to analog audio, converts analog audio to digitized audio, generates internal tones, and generates data, in a manner which minimizes the component parts and hardware for performing such functions. Furthermore, the system is applicable for use in conjunction with a network having a bus which carries time divided multiplex signals comprising a plurality of channels. Since the various functions performed by the system are accomplished within a minimum number of component parts, not only does a compact system result, but one with component densities which enable ready servicing should such be necessary.

Figure 3:
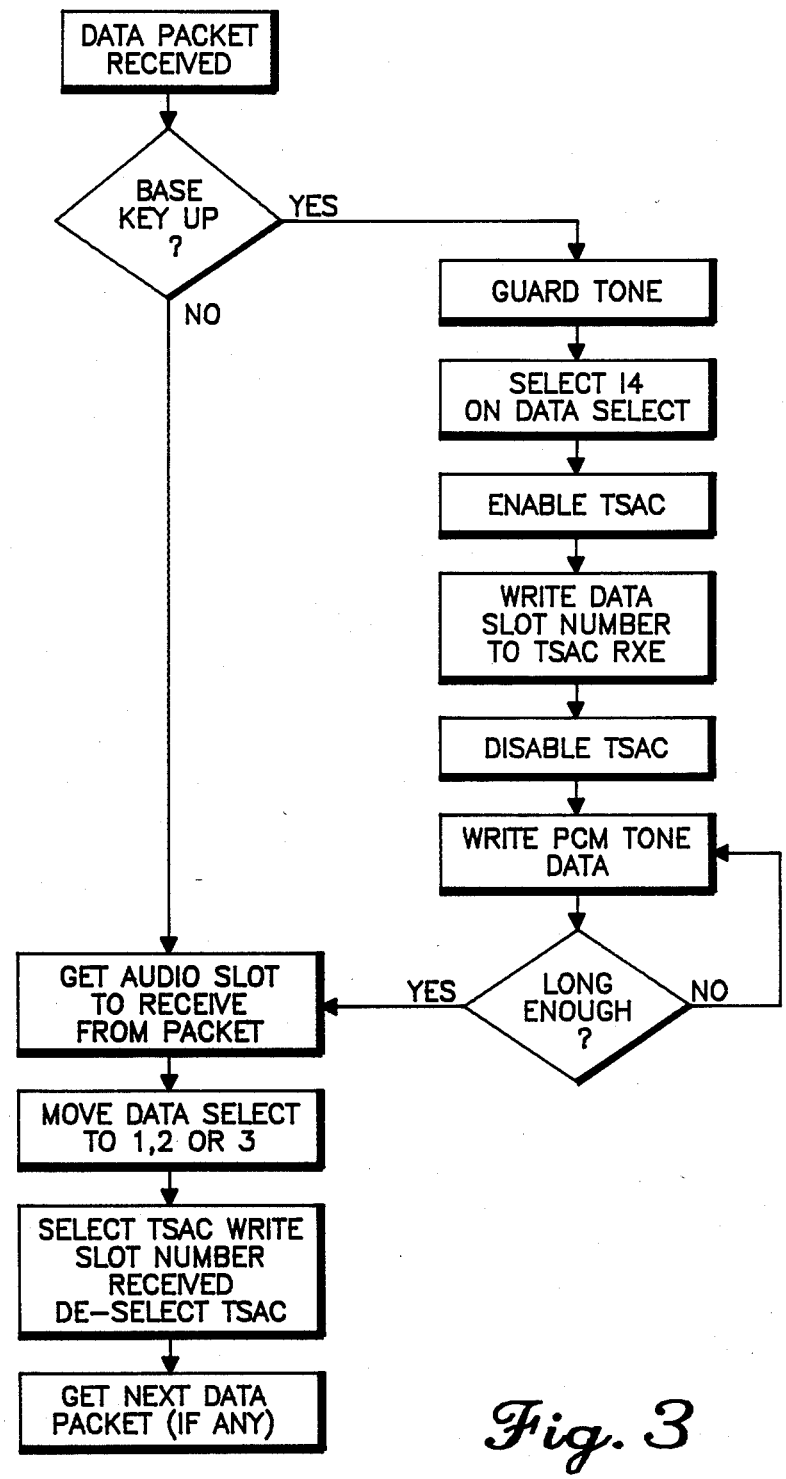
FIG. 3 is a flowchart illustrating the sequence of operation of a portion of the system of FIG. 2 for generating tone signals.

Referring now to FIG. 3, it illustrates a flowchart showing the sequence of operations performed in the control means 46 for generating internal or localized tones. As can be seen, the data packet is received by the control means. The control means then processes the data by first determining whether the data indicates that the base station associated with the system of FIG. 3 is to be keyed up or not. If the answer is no, then the control means 46 assumes that audio is to be received and determines which time slot contains the audio to be received. The control means then enables the data selector or select means 44 to select the appropriate bus which will carry the indicated channel. The control means 46 then through its enable output 72 enables the time slot assignment means 42 and writes therein the number of the channel to be received. Thereafter, the enable signal is removed because the time slot assignment means is set. Each time the time slot carrying the audio to be decoded appears, the time slot assignment means 42 enables the decoding means 40 so that analog audio is provided on line 84 to the transmitter.

If the original processing of the data indicated that the base key-up was yes, the system would first generate a guard tone which tells the base station to listen. Then, the control means 46 causes the select means to couple the output 62 of shift register 48 to the decoding means 40. Then, the time slot assignment means is enabled. Then, the control means provides by output 76 a time slot number to the time slot assignment means and enables its output 86 indicating that the decoding means is to receive a multiple bit digitized word, this time indicating a tone signal. Thereafter, the time slot assignment means is disabled.

The control means 46 then determines the tone to be generated and provides the shift register 48 with an eight-bit binary word indicating the tone signal. An eight-bit binary tone word continues to be produced during each frame. The control means then determines whether the tone has been generated for a long enough period of time. If not, it continues to send, during each frame, a multiple bit word representing the tone signal. If the tone has been sent long enough, then the system operates as if the base key-up was no. That sequence previously referred then ensues. This places the base station on-line to complete the communication. This continues until the next data packet is received which can indicate termination of transmission.

What is claimed is:

1. A remote site interface apparatus for use in a network of the type including a time-division multiplex (TDM) bus for carrying a plurality of digital audio signals and digital control packets assigned to an identifiable time slot, said apparatus providing encoding and decoding of the TDM digital audio signals and control data packets, and for generating control tone signals, said apparatus comprising:
    decoding means for converting a TDM digital audio to an analog signal;
    control means including tone generating means adapted for providing a digitized tone signal and;
    select means responsive to said control means for selectively coupling said decoding means to said bus or to said tone generating means; whereby, when said select means couples said decoding means to said bus, said apparatus outputs said analog audio signal, and when said select means couples said decoding means to said tone generating means, said apparatus outputs an analog tone signal.

2. A remote site interface apparatus as defined in claim 1 wherein said control means further includes channel time slot identification means for identifying the time slot of said at least one channel containing said TDM digital audio representing audio communication.

3. A remote site interface apparatus as defined in claim 2 further comprising time slot assigning means coupled to said decoding means and responsive to said time slot identification means for enabling said decoding means during the time slot of said at least one channel.

4. A remote site interface apparatus as defined in claim 2 wherein said bus contains a data channel for providing digital data communication, wherein said control means is coupled to said bus for receiving data from said data channel, and wherein said channel time slot identification means is responsive to data within said data channel for identifying the time slot of said at least one channel containing said TDM digital audio signal.

5. A remote site interface apparatus as defined in claim 4 wherein said control means is also coupled to said bus for providing digital data signals to said data channel on said bus.

6. A remote site interface apparatus as defined in claim 5 wherein said control means includes means for placing said digital data signals onto said bus within a fixed time slot.

7. A remote site interface apparatus as defined in claim 3 wherein said decoding means further includes encoding means for converting received analog signals to received TDM digital audio signals, and said encoding means being coupled to said bus for placing said received TDM digital audio signals onto said bus.

8. A remote site interface apparatus as defined in claim 7 wherein said encoding means is responsive to said time slot assigning means for placing said received TDM digital audio signals onto said bus within a preassigned time slot.

9. A remote site interface apparatus as defined in claim 1 wherein said bus includes a data channel for data communication and wherein said control means are coupled to said bus and responsive to said data for causing said select means to couple said decoding means to said bus or said tone generating means.

10. A remote site interface apparatus as defined in claim 1 wherein said bus contains a data channel adapted to carry digital data information, and wherein said control means further includes data generating means coupled to said bus for providing digital data signals to said data channel on said bus.

11. A remote site interface apparatus as defined in claim 10 wherein said control means includes a common output for said tone generating means and said data generating means.

12. A remote site interface apparatus as defined in claim 11 further comprising a shift register having an input coupled to said common output, and an output for conveying said digitized tone signal to said select means and for conveying said digital data signals to said bus.

13. A remote site interface apparatus as defined in claim 12 wherein said shift register comprises a parallel input and serial output shift register.

14. A remote site interface apparatus as defined in claim 12 further comprising a buffer between said shift register output and said bus, said buffer being arranged to couple said shift register output to said bus when said digital data signals are provided to said data channel and disconnecting said shift register output from said bus when said at least one multiple bit tone word is conveyed to said select means.

15. A remote site interface apparatus as defined in claim 4 further comprising a shift register for coupling said control means to said bus.

16. A remote site interface apparatus as defined in claim 15 wherein said shift register comprises a serial input and parallel output shift register.

17. A remote site interface apparatus as defined in claim 1 wherein said network bus comprises a plurality of buses, each said bus being arranged for carrying TDM digital audio and digital control packets, and wherein said select means is coupled to each of said buses and to said tone generating means for selectively coupling any one of said buses or said tone generating means to said decoding means responsive to said control means.

18. A remote site interface apparatus as defined in claim 17 wherein one of said buses includes a data channel including digital data information, wherein said control means is coupled to said one bus for receiving data information within said data channel, and wherein said control means is responsive to said data for causing said select means to selectively couple said decoding means to one of said buses or said tone generating means.

19. A remote site interface apparatus as defined in claim 18 wherein said control means further includes channel identification means responsive to said data for identifying the channel containing the digital word to be decoded, and said remote site interface apparatus further including channel assignment means responsive to said channel identification means for enabling said decoding means during the time slot of the channel containing the TDM digital audio to be converted to an analog audio signal.

20. A remote site interface apparatus as defined in claim 19 wherein said decoding means further includes encoding means for converting received audio signals to received digital audio, said encoding means being coupled to one of said buses and responsive to said channel assignment means for providing said received digital audio to said bus within a preassigned channel.

21. A remote site interface apparatus as defined in claim 18 wherein said control means includes data generating means coupled to said one bus for providing multiple bit data to said bus within said data channel.

22. A method of converting a digital multiple bit audio word corresponding to audio information carried on a bus to an analog audio signal and generating internal localized tone analog signals comprising the steps of:
providing a decoder capable of converting a digital multiple bit word to an analog signal;
locally generating at least one digital multiple bit tone word; and
selectively conveying said digital multiple bit audio word on said bus or said locally generated digital multiple bit tone word to said decoder.

23. A method as defined in claim 22 wherein said step of conveying said digital multiple bit audio word to said decoder includes the step of coupling said decoder to said bus.

24. A method as defined in claim 22 wherein there are a plurality of said digital multiple bit audio words on said bus in time divided relation, each word occupying a channel within a time slot and wherein said method provides the converting of a selected one of said digital multiple bit audio words to analog audio signals and including the further step of enabling said decoder only during the time slot which corresponds to said selected one of said digital multiple bit audio words.

25. A method as defined in claim 24 wherein digital data words are provided within one of said time slots, said data including commands for converting a digital multiple bit audio word to an analog audio signal and commands for the local generation of an analog tone signal, said method including the further steps of:
receiving said data;
processing said data; and thereafter,
selectively conveying said digital multiple bit audio word or said locally generated digital multiple bit tone word to said decoder responsive to said data.

26. A method as defined in claim 25 wherein said data further includes information specifying the time slot wherein the selected digital multiple bit audio word is located, and wherein said method further includes the step of enabling said decoder during the time slot of said selected digital multiple bit audio word in response to said data.

27. A method as defined in claim 26 wherein said bus includes a plurality of said buses, wherein said data also includes information specifying the bus carrying the selected digital multiple bit audio word, and wherein said method further includes the step of selectively coupling said decoder to the specified bus in response to said data.

28. A method as defined in claim 24 including the further steps of:
receiving analog audio signals;
conveying said analog audio signals to said decoder;
converting said received analog audio signals to received digital multiple bit audio words within said decoder; and thereafter,
inserting said received digital multiple bit audio words onto said bus within a preassigned time slot.

29. A TDM bus interface apparatus for use with a remote receiver/transmitter in a communication system having at least one console operator position and a plurality of remote sites coupled with a time-division multiplex (TDM) bus which routes digital audio and control data packets, said remote site interface comprising:
decoder means for converting a TDM digital audio signal or a digitized tone signal to an analog output signal;
encoder means for generating a digital audio signal from received analog audio;
control means coupled to said bus for receiving and decoding control data packets, said control means including tone generating means including tone generating means for generating a local digitized tone signal and data generating means for generating data signals, said control means further including time-slot assigner means for indicating that a specific TDM digital audio signal is available on the TDM bus or that a particular TDM slot is available for placing digital audio on the bus; and
select means coupled to said control means and arranged for selectively coupling said deconding means to said bus or to said tone generating means responsive to said control means;
said control means causing said select means to couple said decoding means to said bus or said tone generator means and output said analog audio signal, or enabling said encoder means for placing data onto said bus within a predetermined data channel.

* * * * *